United States Patent [19]

Catalano

[11] Patent Number: 4,671,614

[45] Date of Patent: Jun. 9, 1987

[54] VIEWING OF OBJECTS IN LOW VISIBILITY ATMOSPHERES

[76] Inventor: Salvatore B. Catalano, 29653 Malvina, Warren, Mich. 48093

[21] Appl. No.: 650,474

[22] Filed: Sep. 14, 1984

[51] Int. Cl.$^4$ ............................................. G02B 27/00
[52] U.S. Cl. ................................................. 350/276 R
[58] Field of Search ..................................... 350/276 R

[56] References Cited

U.S. PATENT DOCUMENTS

| | | | |
|---|---|---|---|
| 3,379,827 | 4/1968 | Rossoff | 350/545 |
| 3,682,553 | 8/1972 | Narinder | 356/5 |
| 3,751,166 | 8/1973 | Starkey et al. | 356/5 |
| 3,947,119 | 3/1976 | Bamberg et al. | 350/276 R |

Primary Examiner—William H. Punter
Attorney, Agent, or Firm—Peter A. Taucher; John E. McRae; Robert P. Gibson

[57] ABSTRACT

A viewing system for use in low visibility atmospheres, such as fog, rain, snow, dust, smoke, etc., particularly under nighttime conditions. A cyclically-operated pulsed light source illuminates the scene for brief instances. A shutter is operated in synchronism with the light source for transmitting to a human observer (or TV camera) light rays reflected from objects located selected distance intervals away from the light source; light rays from other zones or areas are excluded. By thus excluding light reflections from zones outside the selected distance interval, it should be possible to minimize glare associated with the excluded light, thereby improving the view of objects located within the selected distance interval. The viewing system may include mechanisms for varying the time relationships between the pulsed light source and shutter, such that different selected distance intervals are viewed in continuous progression; the different views are flashed very rapidly so that the human observer or TV camera effectively sees objects in various different distance intervals, e.g., the entire range distance of the light source.

1 Claim, 4 Drawing Figures

VIEWING OF OBJECTS IN LOW VISIBILITY ATMOSPHERES

GOVERNMENT INTEREST

The invention described herein may be manufactured, used, and licensed by or for the Government for governmental purposes without payment to me of any royalty.

BACKGROUND AND SUMMARY OF THE INVENTION

This invention relates to mechanisms for improved viewing of objects in low visibility atmospheres (e.g., in fog, smoke, dusty conditions, snow or rain, etc.).

When lights are used in attempts to penetrate low visibility atmospheres considerable glare is generated. Glare is partially responsible for the limited distance one is able to see in low visibility atmospheres. Increasing light intensity in an attempt to see further in low visibility atmospheres increases glare; as glare increases, diminishing returns are realized for further increases in light intensity. Eventually a point is reached where further increases in light intensity increase glare to such an extent that the distance one is able to see in the low visibility atmosphere is lessened.

Under my invention, improved viewing is accomplished by minimizing the effects of glare (thereby allowing use of higher intensity lights). Glare reduction is achieved by viewing only a short interval of distance ahead at a time (to the exclusion of all other intervals), and sequentially viewing succeeding intervals of distance one at a time. These distance intervals are designed to be shorter than the distance the unaided eye can see in the illuminated low visibility atmosphere.

My invention can be used with various types of lighting systems, e.g., automobile headlights; airplane landing lights; laser lights; portable lamps used or worn by miners, telephone repairmen or soldiers; or search lights on military, nautical or emergency vehicles.

The invention contemplates a light pulsing system for illumination. The pulsing light source can be a conventional light source and an electronic shutter cooperatively arranged to generate light pulses of predetermined duration and predetermined spacing. Alternately, the pulsing light source can be a pulsed laser or similar light element. In most cases, the time duration of each light pulse is materially less than the time spacing between successive pulses, e.g., a pulse duration of 0.1 microsecond and a pulse spacing of 1 microsecond. Return light from the viewed object (target) is controlled by a second shutter that is gated (opened and closed) at appropriate instants and for appropriate time durations relative to the pulse generation time, such that the human viewer sees only objects located predetermined distances away from the viewer. The second shutter ensures that the viewer will see objects illuminated by the light pulse after that pulse has travelled a predetermined distance (toward said objects and back to the viewer); objects closer to, or further away from, the viewer are excluded from the illuminated scene passed through the second shutter.

Objects of the invention are to provide an illumination-viewing system wherein:

1. Only objects within prespecified distance intervals are viewed at any one instant.
2. Undesired light reflections and glare from objects outside the prespecified distance intervals are eliminated from view.
3. Different prespecified distance intervals can be selected, varied, or sequenced, such that the human viewer can practically simultaneously preceive objects in different distance intervals.
4. Undesired glare generated outside the prespecified distance intervals can be excluded from view.
5. Contrast between objects within the prespecified distance interval and ambient low visibility atmosphere glare is enhanced.

THE DRAWINGS

FIG. 1 schematically illustrates a system embodying my invention.

Figure 4:
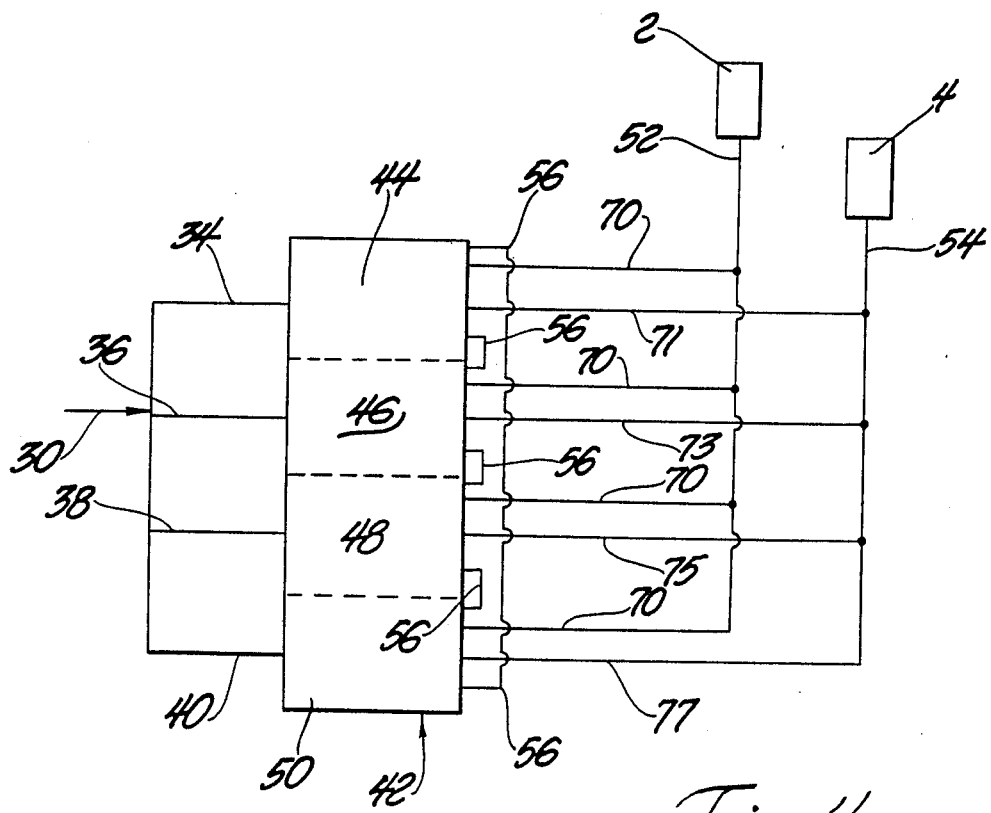

FIG. 4 schematically illustrates a pulse-generation system usable in practice of the invention.

DETAILED DESCRIPTION

Figure 1:
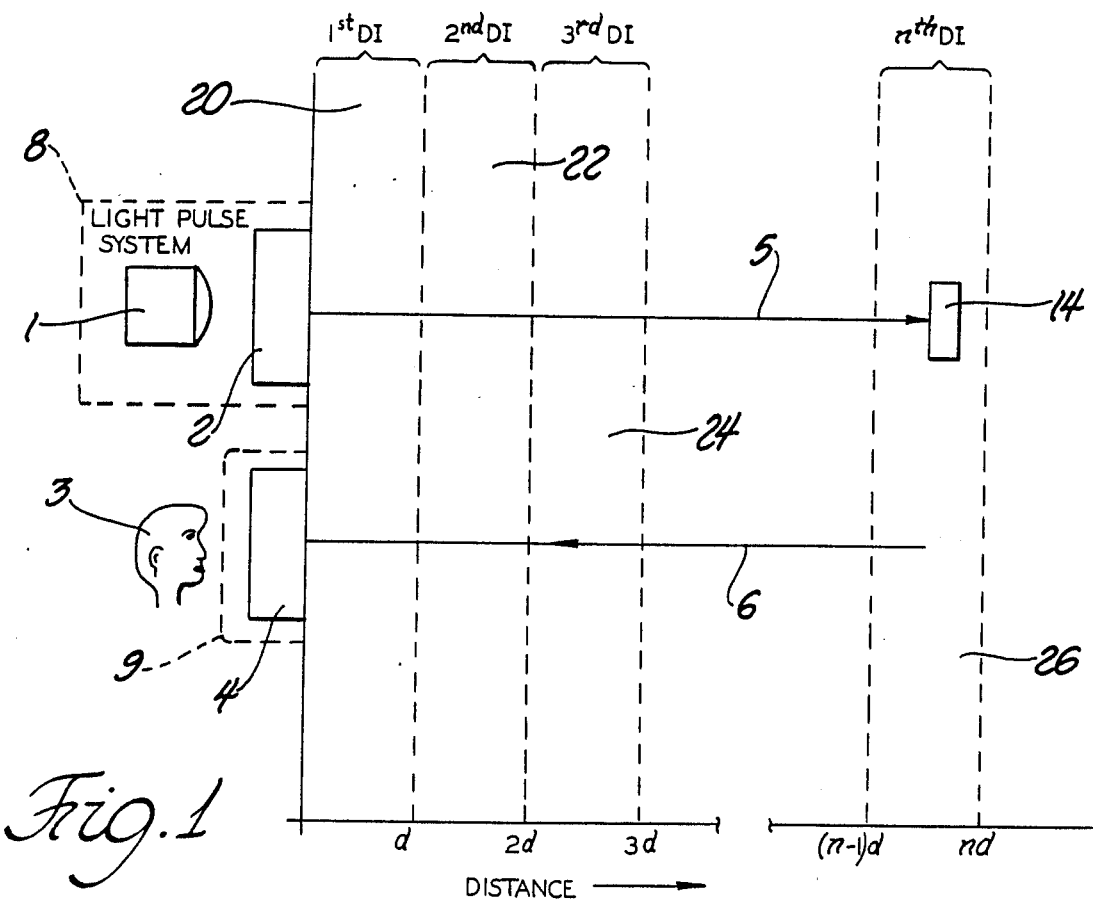

FIG. 1 schematically illustrates a "low visibility atmosphere" viewing system embodying my invention. The illustrated system comprises a light-sending means 8 and light receiving means (or station) 9 arranged in close proximity to one another.

Sending means 8 comprises a light source 1 arranged to direct a light ray through shutter 2 along direction line 5 to a remote object (target) 14. The distance ahead of light source 1 in the viewing system (encompassing the remote objects to be viewed) is divided into n intervals each of length d. These are the distance intervals referred to earlier.

The speed of light is approximately 1,000 feet per microsecond (one millionth of a second). If light source 1 has an effective range (penetration distance) of 3,000 feet and the total viewing distance were divided into six distance intervals: from 0 to d, from d to 2d, from 2d to 3d, etc.; d would represent five hundred feet. In terms of light travel each distance interval could be considered to have an effective width of about 1 microsecond (i.e., the time for light to make one traverse back and forth across the distance interval).

Within the broader aspects of the invention, light source 1 can be any conventional lamp suited to the particular situation, e.g., an automotive headlight, a flashlight, a searchlight atop a military vehicle, a landing light on an airplane, etc. One particular light source of interest is a Xenon searchlight used on military tanks for illuminating enemy soldiers or enemy vehicles during nighttime operations, in fog, or other low visibility atmosphere. Such a searchlight commonly operates on 28 volts D.C., at 100 amperes, to direct a light beam through a maximum range distance of about 3,000 feet. The searchlight can be set to project a narrow light beam about one half degree in width or a wide beam about seven degrees in width. The light beam can be white light or infrared. Alternatively a pulsed laser may be used as the pulsed light source rather than light source 1 and shutter 2.

In the FIG. 1 arrangement, the light ray is reflected from target object 14 back toward a second shutter 4 in receiving station 9. Human observer 3 views the scene passed through shutter 4. In some situations a TV camera could occupy the position of human observer 3.

The reflected ray would be on a line very close to ray line 5; however, for differentiating purposes, the reflected ray (designated by numeral 6) is shown spaced from ray line 5. Viewer station 9 can comprise merely an automotive windshield, observation window, eyeglasses or other non-magnification light transmitter; alternatively the viewer station could include light intensification/magnification devices such as a telescope, binoculars, or military periscope or infrared/night-vision equipment, etc. Shutter 4 may be constructed similarly to shutter 2 (although each shutter may have a different shutter-open time).

Figure 2:
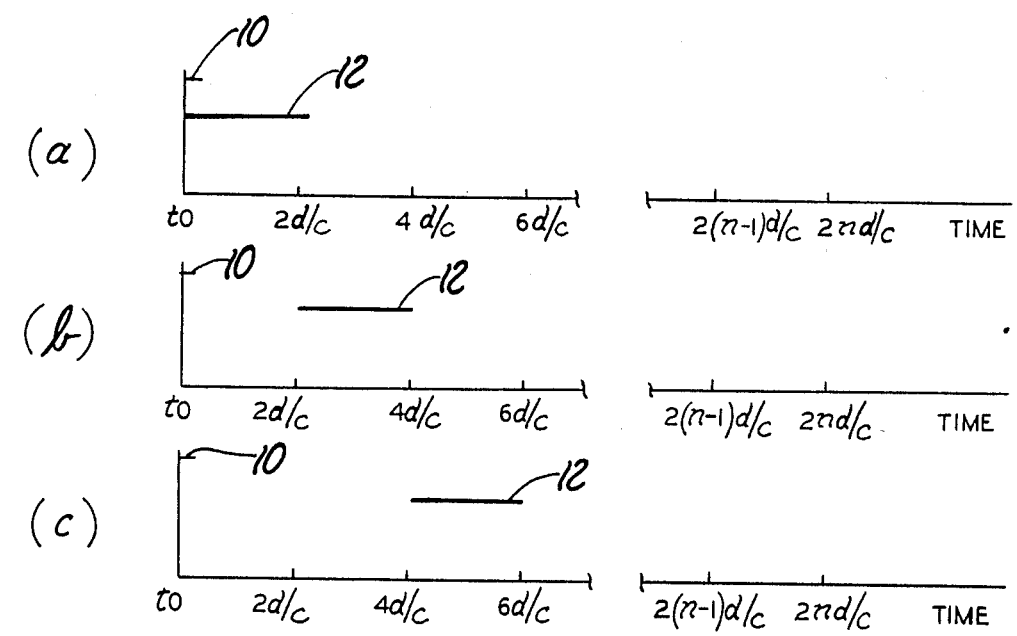
FIG. 2 is a chart illustrating the time duration and spacing of light pulses used in practice of the invention.

FIG. 2 is a chart illustrating representative shutter-open times for shutters 2 and 4, when it is desired to view target scenes at different distances from the sending-receiving stations 8 and 9. The shutter-open time for shutter 2 is designated by numeral 10; the shutter-open time for shutter 4 is designated by numeral 12.

In FIG. 2, d on the x-axis represents an arbitrary distance that is a predetermined percentage of the penetration distance of the aforementioned light source 1; d is the same quantity as the "d" used in FIG. 1. The term c is the speed of light. The quantity 2d/c is the time required for a light pulse (of infinitely small duration) to travel from sending station 8 through distance d (along ray line 5) and return to receiving station 9 (along ray line 6).

Curve (a) in FIG. 2 shows the shutter-open times required to view any object located within distance d from the sending-receiving stations 8, 9; this would correspond to the first distance interval 20 in FIG. 1. Shutter 2 opens for a very short period of time compared to shutter 4. Shutter 4 remains open only long enough for the short-duration light pulse to move from station 8 through distance d (to any targets within such distance) and to return through distance d to receiving station 9. Light travelling further than distance 2d reaches shutter 4 after it has closed; therefore, targets beyond this distance interval 20 (FIG. 1) are not seen by human observer 3.

Curve (b) in FIG. 2 shows the shutter-open times required to view any objects located within the second distance interval designated by numeral 22 in FIG. 1; i.e., from d to 2d. In this case, shutter 4 opens at time 2d/c and closes at time 4d/c. Light reflected from objects in zone 20 (FIG. 1) reaches shutter 4 before it opens. Light reflected from objects in zone 24 (and therebeyond) reaches shutter 4 after it has closed.

Curve (c) shows the shutter-open times required to view objects located within zone 24 (FIG. 1); i.e., distance interval from 2d to 3d. Curve (d) is a generalized representation of the shutter-open time for shutter 4. As regards curve (d), "n" represents the number of distance intervals under consideration.

As noted above, the "open" time for shutter 2 is much less than the "open" time for shutter 4. The time relationships are somewhat arbitrary. However, a 10 to 1 relationship is considered suitable; i.e., if shutter 4 has an open time of 1 microsecond then shutter 2 should have an open time of about 0.1 microsecond.

If the open time for shutter 2 is made too long in relation to the open time for shutter 4, there is a danger that when shutter 4 opens, it will receive rays reflected from the foreground area in front of the designated distance interval, and that when shutter 4 closes, it will be receiving rays reflected from the background area beyond the designated distance interval. The following general equations are believed to provide satisfactory shutter operational times:

To observe only objects in the first distance interval, synchronize the shutters as follows:
Open illuminating shutter 2 at
$t = t(0)$
Close it at $$t = t(0) + 2d/10c \qquad \text{equation 1}$$

where d=length of the distance interval, and
where c=velocity of light
Open observer's shutter 4 at
$t = t(0)$
Close it at
$t = t(0) + 2d/c$ To observe only objects in the second distance interval, synchronize the shutters as follows:
Open illuminating shutter 2 at
$t = t(0)$
Close it at
$t = t(0) + 2d/10c$
Open observer's shutter 4 at
$t = t(0) + 2d/c$
Close it at
$t = t(0) + 4d/c$ To observe only objects in the third distance interval, synchronize the shutters as follows:
Open illuminating shutter 2 at
$t = t(0)$
Close it at
$t = t(0) + 2d/10c$
Open observer's shutter 4 at
$t = t(0) + 4d/c$
Close it at
$t = t(0) + 6d/c$ To observe only objects in the n-th distance interval, synchronize the shutters as follows:
Open illuminating shutter 2 at
$t = t(0)$
Close it at
$t = t(0) + 2d/10c$
Open observer's shutter 4 at $$t = t(0) + 2d(n-1)/c \qquad \text{equation 2}$$

Close it at $$t = t(0) + 2dn/c \qquad \text{equation 3}$$

where n=1, 2, 3, etc., to the total number of distance intervals in the system.

Shutters 2 and 4 are operated independently, but synchronously so that light is projected along pathlines 5 and 6 as discrete time-spaced pulses. An aim of this invention is to synchronize the two shutters so that the human observer sees only the time-spaced light pulses reflected from the prespecified distance interval. Light rays passing beyond this distance interval and reflected back toward shutter 4 arrive too late for viewing (i.e., shutter 4 is already closed and prevents them from passing through to viewer 3). Similarly, light rays reflected from objects located in front of the prespecified distance interval arrive too early (i.e., shutter 4 has not opened yet and prevents them from passing through). Such reflections are excluded from the scene viewed by observer 3 so that light reflections of objects and glare from all but the prespecified distance interval are eliminated.

The process of directing-receiving the light pulses is repeated many times per second in order to achieve sufficient light intensity at viewer station 9 for the human observer to view the objects in the prespecified distance interval. Hopefully, the contrast between objects and glare in the prespecified distance interval is enhanced.

Figure 3:
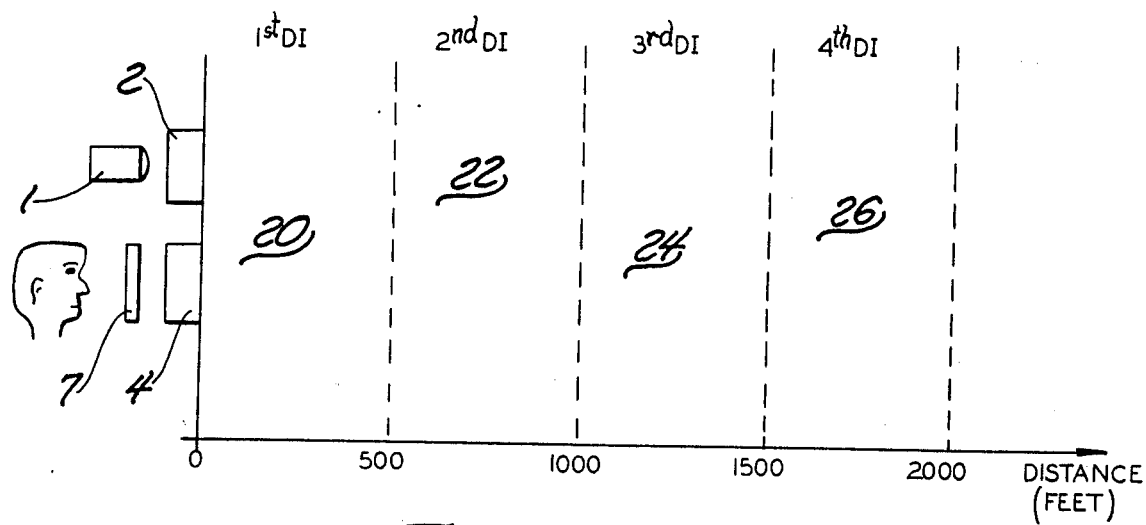
FIG. 3 shows the FIG. 1 system, with specific distances marked off to designate distance intervals used in practice of the invention.

FIG. 3 is included for discussion purposes. It includes a distance scale from 0 to 2000 feet, with four distance intervals spanning this distance. The first is from 0 to 500 feet, the second from 500 to 1000 feet, the third from 1000 to 1500 feet, and the fourth from 1500 to 2000 feet. The above noted equations can be used to determine when shutters 2 and 4 are to be opened and closed for any distance interval. Simply use n=1 for the first distance interval, n=2 for the second distance interval, n=3 for the third distance interval, etc. For example to view objects in the second distance interval, use n=2 in equations 2 and 3. The value of d is 500 feet for each distance interval in this example. The value of c (i.e., the velocity of light) is approximately 1000 feet/microsecond. Accordingly, to view objects in the second distance interval:

1. Open the illuminating shutter 2 at a given time t(0)=0.
2. Close it at a time 2d/10c later (i.e., close it at 2(500) feet/10(1000) feet/microsecond). That is, close it 1/10 microsecond after it is opened.
3. Open the observer's shutter 4 at $t=t(0)+2d(n-1)/c$ (i.e., open it at $t=t(0)+2d/c$). That is open it at $t=0+2(500$ feet)/1000 feet/microsecond. That is, open shutter 4 at t=1 microsecond.
4. Close shutter 4 at $t=t(0)+4dc$. That is, close it at $t=0+4(500$ feet)/1000 feet/microsecond. That is, close shutter 4 at t=2 microseconds.

Light reflected from within the first distance interval will not pass through shutter 4 and will be prevented from being seen since such reflections arrive at shutter 4 prior to its being opened. Visualize an object at 499 feet (in the first distance interval); its reflection is among the latest in the first distance interval to arrive at shutter 4. Using t=2d/c we find its reflection arrives at just less than 1 microsecond after shutter 2 is opened, but shutter 4 is still closed at this time, thereby preventing this object from being seen.

Similarly, light reflected from within the third distance interval will not pass through shutter 4 and will be prevented from being seen, since these reflections arrive at shutter 4 after shutter 4 is closed. Visualize an object at 1001 feet (in the third distance interval); its reflection is among the earliest in the third distance interval to arrive at shutter 4. Using t=2d/c, we find its reflection arrives at just over 2 microseconds, but shutter 4 has already closed by this time, thus preventing this object from being seen. It will be understood then that reflections from objects outside of the second distance interval are not viewed when using shutter timings calculated in this example.

A similar calculation can be used to verify that objects within the second distance interval will be viewed using shutter timings calculated in this example. Visualize an object at 501 feet (in the second distance interval); its reflections are among the earliest from within the second distance interval to arrive at shutter 4. Using t=2d/c we find its reflection arrives at just over 1 microsecond after shutter 2 is opened, but since shutter 4 is already open at this time, its reflection passes through shutter 4 and is viewed at observer station 9.

Similarly, reflections from an object in the second distance interval located at 999 feet will be among the latest from within the second distance interval to arrive at shutter 4. Using t=2d/c we find its reflection arrives at just under 2 microseconds after shutter 2 is opened, and since shutter 4 has not closed yet, its reflection passes through shutter 4 and is viewed at observation station 7. It will be understood that only reflections from objects within the second distance interval are viewed when using shutter timings calculated in this example.

It should be pointed out that this procedure of opening and closing the shutters must be repeated numerous times per second in order to present enough light at the viewer station 9 to be seen by the human viewer. Repetition rates on the order of perhaps 100,000 per second or so may be required. Rapid sequencing of views from that of the first distance interval to that of the last distance interval of interest could present an integrated view of the entire distance from the first to the last distance interval.

In order to see an integrated view of distance in the low visibility atmosphere, the various distance intervals would be repeatedly gated/flashed before the eyes in sequence. Attention/adjustment to variables such as the rate of gated flashes, length of gated flashes, rate of repetitions, periods of time between the gated flashes and/or repetitions, intensity of illuminating light, etc., would be required in order to effect a working system.

It will be seen from the equations that the time duration that shutter 2 is required to remain open (2d/10c) is very short. Similarly, the time duration that shutter 4 is required to remain open in order to observe only objects in a given distance interval (2d/c) is relatively short. For example, for a distance interval 15 meters long, the time duration for shutter 2 would be 0.01 microsecond, and the time duration for shutter 4 would be 0.1 microsecond. Mechanical shutters might not be feasible for this application; electro-optical shutters (or some other type of high technology light pulsing and shuttering techniques) would be more appropriate. The light pulse generating system (consisting of light source 1 and shutter 2) might be replaced with a pulsed laser. In any event, pulse control action is probably best carried out with an electronic control mechanism.

It is believed that the electronic circuitry required to achieve the required shutter-operating timing and sequencing of views can be achieved with solid state circuitry already in existence. Attention/adjustment to variables such as rate of gated flashes, length of gated flashes (equation 1), rate of repetitions, intensity of illumination, etc., would be required in order to effect a working system.

One possible arrangement is shown in FIG. 4. Clock pulses at relatively high frequency, e.g., 10,000 pulses per microsecond, are supplied through circuit line 30 to input lines 34, 36, 38 and 40 for four counter stages 44, 46, 48 and 50 (one for each of the aforementioned illumination zones 20, 22, 24, or 26 in FIGS. 1 and 3).

Counter stage 44 acts as a frequency divider to provide elongated output pulses in two output lines 70 and 71. The other three counter stages produce output pulses in output lines 70, 73 or 70, 75 or 70, 77. Output line 70 connects with a voltage supply line 52 for shutter 2. Each output line 71, 73, 75 and 77 connects with voltage supply line 54 for shutter 4. Each counter stage includes a clear or reset line 56 that temporarily disconnects the associated stage and simultaneously triggers the next counter stage.

Counter stage 44 produces two output pulses, one for operating shutter 2 and another for operating shutter 4. The time constraints are set in accordance with the shutter-open periods necessary to illuminate zone 20 (FIG. 1). Counter stages 46, 48 and 50 produce output pulses in accordance with the shutter 4 open periods necessary to sequentially illuminate zones 22, 24, and 26 (FIG. 1).

As indicated, the different counter stages 44, 46, 48 and 50 may be operated sequentially, in which case human viewer 22 is provided with a view of the entire scene (from zero feet up to the limits of the illumination system); preferably there is a minimum time delay between operation of succeeding stages, via reset lines 56. Thus, there is no significant delay between any given reflected light pulse 12 and the next outgoing light pulse 10. The scene will appear as a series of separate pictures specific to different zones, e.g., zone 20 alone, then zone 22 alone, then zone 24 alone, then zone 26 alone, then back to zone 20 alone, and so on. The zones, or distance intervals, are non-overlapping but contiguous in nature, as depicted in FIG. 3. The separate pictures are so closely spaced timewise that the human observer does not perceive any picture demarcation. However, exclusion of background zones (or foregound zones) from individual pictures tends to minimize background glare and improve overall picture quality and visibility.

It is contemplated that the system could include manual adjustments for selectively energizing counter stages 44, 46, 48 and 50. For example, in one condition of adjustment only counter stage 44 would be operative, in which case the human observer would see ony objects in zone 20; objects in zones 22, 24 and 26 would be excluded from the picture passing through shutter 4. For military application, it might be possible to use the system for range finder purposes (i.e., energization of a particular counter stage would correspond to a specific range distance).

It is to be noted that the illustrated technique is a pulse-echo technique (a light pulse is flashed; its "echo" or reflection is detected later). Pulse-echo techniques are sometimes termed "ranging," and are used in radar to measure the distance (range) to a remote object. The pulse-echo technique is used in sonar to measure the distance (range) to a remote object or the bottom of the ocean. The pulse-echo technique is used in ultrasonics to determine the distance to a flaw beneath the surface of a material. Military tanks use the pulse-echo technique in laser ranging mechanisms for measuring the distance (range) to the target at which it is shooting. In these prior art techniques, the target distance is measured as the time required for a radiation pulse to travel to the target and return to the sensing unit. Shutters corresponding to shutter 4 are not employed.

The use of the pulse-echo technique in this invention is not for determining/measuring distance, per se. It merely makes use of the pulse-echo technique and shutter 4 in viewing station 9 for enabling a human viewer to more clearly observe remote objects at specific distance intervals.

The above description presupposes that each distance interval 20, 22, 24 or 26 has the same width dimension d. It is possible to make one or more of the distance intervals narrower (or wider) than the other distance intervals. This may be accomplished, for example, by varying the time constants for the pulse output lines in counter stages 44, 46, 48 and 50 (FIG. 4). By thus varying the width(s) of selected distance intervals, it may be possible to differentiate objects of particular interest from other objects in which there is little or no interest. In general, the amount of glare associated with any one light pulse is related to the width of the distance interval being viewed; narrow distance intervals generate less glare than wider distance intervals. Objects located within narrow distance intervals may have somewhat greater clarity than objects located within wider distance intervals.

A target acquisition system can be visualized wherein the counter stages 44, 46, 48 and 50, etc., are sequenced until an object is located in a particular distance interval 20, 22, 24, 26, etc. At that time, the counter stage constants are altered to enable the system to concentrate on the particular distance interval of special interest. When any one distance interval is viewed, to the exclusion of other distance intervals, the light pulses 10 (FIG. 2) have a relatively high pulse frequency, such that a generally high illumination level is maintained. A high illumination level reduces shadows and otherwise improves the clarity of objects being viewed.

I wish it to be understood that I do not desire to be limited to the exact details of construction shown and described for obvious modifications will occur to a person skilled in the art, without departing from the spirit and scope of the appended claims.

What is claimed is:

1. A system for viewing target objects in a low visibility atmosphere containing significant particulate matter in the form of fog, snow, rain, dust or smoke, where atmospheric glare due to backscattered light tends to unduly limit the distance at which target objects are visible: said system comprising a light pulse source operable to direct time-spaced outgoing light pulses (10) of a required intensity through a multiplicity of non-overlapping contiguous distance intervals; a viewer station comprising a shutter device operable to receive light rays reflected from objects located in said distance intervals; means for controlling the shutter device so that at any one shutter-open period, the device passes a reflected light pulse (12) from only one distance interval; and sequencing means for causing the shutter device to sequentially pass light pulses from different distance intervals; said sequencing means being operable so that a given sequence takes place as a progression from the distance interval nearest the shutter device to the distance interval furthest from the shutter device, without significant delay between any given reflected light pulse (12) and the next outgoing light pulse (10); the sequence of shutter operations being repeatable without interruption, whereby the shutter device effectively presents to the viewer the entire scene encompassed by the contiguous distance intervals; each light pulse having a duration time $2d/10c$ and the shutter device having an open duration time $2d/c$, where d is the width of a distance interval, and c is the speed of light; the delay time between each light pulse and the instant of shutter opening being approximately $n\,2d/c$, where n is the number of distance intervals between the viewer station and the distance interval exposed when the shutter opens; said light source having a pulse duration time of about 0.1 microsecond, and the shutter device having a shutter-open time of about 1 microsecond, such that the light source pulse duration time is only about one tenth the shutter-open time.

* * * * *